(12) United States Patent
Tsai et al.

(10) Patent No.: US 7,186,775 B2
(45) Date of Patent: Mar. 6, 2007

(54) METHOD FOR IMPROVED THE HANDLING HEAT-RESISTANCE OF THE ETHYLENE-VINYL ALCOHOL COPOLYMER

(75) Inventors: Jing Jin Tsai, Miaoli (TW); Li Shing Lin, Miaoli (TW); Huan Ming Chang, Miaoli (TW); Kuang Hui Fan, Miaoli (TW); Weng Shing Lin, Miaoli (TW)

(73) Assignee: Chang Chun Petrochemical Co., Ltd., Taipei (TW)

( * ) Notice: Subject to any disclaimer, the term of this patent is extended or adjusted under 35 U.S.C. 154(b) by 272 days.

(21) Appl. No.: 10/503,949

(22) PCT Filed: Jun. 20, 2003

(86) PCT No.: PCT/CN03/00479

§ 371 (c)(1),
(2), (4) Date: Aug. 19, 2004

(87) PCT Pub. No.: WO2004/113398

PCT Pub. Date: Dec. 29, 2004

(65) Prior Publication Data

US 2005/0228129 A1    Oct. 13, 2005

(51) Int. Cl.
C08J 33/00 (2006.01)
C08K 33/00 (2006.01)
C08L 29/04 (2006.01)

(52) U.S. Cl. .................... 524/557; 568/700; 525/59

(58) Field of Classification Search ............... 568/700; 524/557; 525/59
See application file for complete search history.

(56) References Cited

U.S. PATENT DOCUMENTS 6,340,645 B1 * 1/2002 Horacek et al. ............ 442/138

FOREIGN PATENT DOCUMENTS

| JP | B 46-37664 | 11/1971 |
| JP | B 55-19242 | 5/1980 |
| JP | B 57-5834 | 2/1982 |
| JP | 11152307 A * | 6/1999 |

* cited by examiner

Primary Examiner—Thurman K. Page
Assistant Examiner—Chukwuma Nwaonicha
(74) Attorney, Agent, or Firm—Bacon & Thomas PLLC

(57) ABSTRACT

The present invention relates to a method for increasing the heat-resistant of ethylene-vinyl alcohol copolymer (EVOH), the method is characterized by using a mixture of acetic acid, magnesium dihydrogen phosphate, and potassium dihydrogen phosphate at a certain ratio as an acid-treating solution in the acid-treating procedure of a process for preparing EVOH. The EVOH produced by the method of the present invention exhibits an excellent heat-resistance and does not become yellowing attributed to the elevated processing temperature. Also, the EVOH generated by the method of the present invention exhibits a uniform heat-resistance since the additives are dispersed evenly in the EVOH.

9 Claims, No Drawings

METHOD FOR IMPROVED THE HANDLING HEAT-RESISTANCE OF THE ETHYLENE-VINYL ALCOHOL COPOLYMER

FIELD OF THE INVENTION

The present invention relates to a method for increasing heat-resistant of Ethylene-Vinyl Alcohol Copolymer (EVOH), in particular to a method in which certain acids are added at a certain ratio in the acid-treating procedure thereby increasing the heat-resistant of the resultant ethylene-vinyl alcohol copolymer.

BACKGROUND OF THE INVENTION

Since ethylene-vinyl alcohol copolymer possesses a high oxygen barrier property and exhibits excellent processing property and solvent-resistance, it has been widely used in various applications such as food package, chemical solvent package, preserving the aroma of cosmetic perfume, recently. However, during the processing of EVOH, EVOH should pass through an extruder at an elevated temperature to be molten so that EVOH should undergo an elevated temperature for a period (usually at a processing temperature of from 200 to 240° C.). Under the processing condition, EVOH will become serious yellowing in quality if no additive for increasing heat-resistance is added. It also experimentally demonstrated that EVOH having been added with such additional additives exhibits a better heat resistance and can withstand a higher temperature.

Such additives are conventional added into dried EVOH copolymer by blending means, which certainly would produce a non-uniform mixture and in turn result in yellowing on part of the processed product. Therefore there are many proposals to improve EVOH's heat-resistance. For example, Japan Patent Examined Publication Sho 46-37664 disclosed treatment of EVOH with various acids such as acetic acid, formic acid, and tartaric acid. The prepared EVOH in Sho 46-37664 possesses different decomposing temperature, which is a temperature for achieving 5% by weight heat-loss. Japan Patent Examined Publication Sho 55-19242 disclosed a method for improving heat-resistance of EVOH by adding a mixture of acetic acid and phosphoric acid. Japan Patent Examined Publication Sho 57-5834 disclosed incorporation of a mixture of organic acids and their sodium or potassium salt to increase heat-resistance of EVOH. In the examples of Sho 57-5834, it used a mixture of sodium benzoate and potassium benzoate, and of adipic acid and sodium adipate. However, since benzoates contain a benzene ring, incorporation of it into EVOH will cause the EVOH not suitable for food package field.

However, the heat-resistance of EVOH produced by the above processes is still not satisfactory. There still requires a method for further increasing the heat-resistance of EVOH.

Under this circumstance, the present inventors have conducted an investigation on EVOH properties and found that before drying, EVOH is a porous material. By utilizing such a porous property, incorporation of additives into aqueous solution in acid-treating step prior to drying will allow the additives disperse in the pores uniformly, thereby a heat-resistance of EVOH increases and the resulting product exhibits uniform heat-resistance.

The present invention has been completed based on the above finding.

SUMMARY OF THE INVENTION

The present invention provides a method for increasing heat-resistance of an ethylene-vinyl alcohol copolymer (EVOH), which is characterized by using a mixture of acetic acid, potassium dihydrogen phosphate, and magnesium dihydrogen phosphate at a certain ratio as an acid-treating solution to carry out the acid-treatment of the EVOH, and then dehydrating and drying. According to the method of the present invention, the product formed from the prepared EVOH exhibits improved heat resistance after drying.

DETAILED DESCRIPTION OF THE INVENTION

Conventionally, a process for producing ethylene-vinyl alcohol copolymer (EVOH) generally comprises the steps of:

(1) Copolymerization: starting monomers, ethylene and vinyl acetate, are subjected to copolymerization by using methanol as a reaction solvent at a temperature of about 55 to 75° C. under a pressure of 25 to 60 kgf/cm$^2$ to produce ethylene-vinyl acetate copolymer (EVOAc);

(2) Stripping of monomers: Un-reacted ethylene and vinyl acetate are stripped off along with methanol;

(3) Alkalization: the resultant EVOAc is hydrolyzed by a base such as sodium hydroxide to produce EVOH solution;

(4) Pelletization: the resultant EVOH solution is discharged from the reaction system with methanol gas, passes through an extruder to form strands, and then cut into EVOH pellets;

(5) Water washing and acid treatment: the resultant EVOH pellets are washed thoroughly with water and then subjected to acid-dipping treatment with aqueous acetic acid solution; and (6) Dehydration and drying: the acid-treated EVOH pellets are dehydrated by centrifuging and then dried in an oven to obtain EVOH product.

The present invention provides a method for increasing heat-resistance of an ethylene-vinyl alcohol copolymer (EVOH), which is characterized by using a mixture of acetic acid, potassium dihydrogen phosphate, and magnesium dihydrogen phosphate at a certain ratio as the acid-treating solution in the above step (5) to improve the heat resistance of the EVOH.

In the method for increasing heat-resistance of EVOH according to the present invention, a mixture of acetic acid, magnesium dihydrogen phosphate, and potassium dihydrogen phosphate is used to substitute for acetic acid which is conventional used in acid-treating step. As mentioned above, since the EVOH is a porous material before drying, additives such as magnesium dihydrogen phosphate and potassium dihydrogen phosphate can disperse evenly in EVOH during the acid-treating procedure so that a heat resistance of EVOH could be increased.

In the method for producing ethylene-vinyl alcohol copolymer (EVOH) according to the present invention, acetic acid is used in an amount of 0.1 to 1.0 wt %, preferably 0.1 to 0.5 wt %; magnesium dihydrogen phosphate is used in an amount of 0.02 to 0.5 wt %, preferably 0.03 to 0.45 wt %; and potassium dihydrogen phosphate is used in an amount of 0.05 to 0.5 wt %, preferably 0.05 to 2.5 wt %, based on weight of the solid content of EVOH before acid-treating step. The acid-treating step could be carried out at various additives ratio as long as the acids are used in the specified range. The EVOH prepared by the method of the present invention possesses an improved heat-resistance.

In the method for producing (EVOH) according to the present invention, magnesium dihydrogen phosphate and potassium dihydrogen phosphate could also be a solvated form, especially a hydrated form, such as magnesium dihydrogen phosphate tetrahydrate. But the used amount is based on the weight of an anhydrous form.

The present invention is illustrated by reference to the following Examples and Comparative examples. However, the Examples are only used for illustrating the present invention without limiting the scope of the present invention.

EXAMPLE 1

This Example was illustrated by a continuous process for preparing EVOH from copolymerization of ethylene and vinyl acetate. In a copolymerization reaction system, a 100-liter reactor (L/D=1.27) with a resistance to pressure of up to 200 kgf/cm$^2$ equipped with a stirrer and a jacket for cooling was used. The following components were fed continuously into the reaction system:

| | |
|---|---|
| Vinyl acetate feed rate | 7.6 kg/hr |
| Methanol feed rate | 0.23 kg/hr |
| 2,2'-Azodiisobutylnitrile | 2.3 g/hr |
| Copolymerization temperature | 60° C. |
| Ethylene pressure | 4.3 kgf/cm$^2$ |
| Average retention time | 6 hrs |

After copolymerization, the resultant ethylene-vinyl acetate copolymer (EVAc) was discharged from the bottom of the reactor, the pressure of EVAc was released, and ethylene was vaporized off. The un-reacted vinyl acetate contained in EVAc was removed in a distillation column as follows. EVAc discharged from the bottom of the reactor was fed into the top of the distillation column and gaseous methanol was purged from the bottom of the distillation column. Thus the un-reacted vinyl acetate would be removed from the reaction system by utilizing azeotrpoic property of methanol with vinyl acetate under ambient pressure. At the bottom of the distillation column, a solution of EVAc in methanol was collected.

The resultant methanolic solution of EVAc was fed into a separate reacting distillation column at overhead. Alkalizing catalyst sodium hydroxide was diluted to 2.5% with methanol, then divided into three parts and separately added to the reacting distillation column at three positions (note: normality of sodium hydroxide was 0.025N). Gaseous methanol was purged into the reacting distillation column at its bottom to carry the byproduct methyl acetate out of the system. The pressure in the column was 3 kgf/cm$^2$ and overhead temperature was 106° C. At the bottom of the distillation column, a solution of EVOH in methanol was discharged from the column.

A steam was blown into the resultant EVOH solution to evaporate partly of methanol until a solid content of EVOH solution was 37.84% by weight. The solvent contained in the EVOH solution was a mixture of methanol/water of 70/30. The EVOH solution was extruded into strands through an extruder having an inner diameter of 3.5 mm and entered into a condenser tank and maintained for 60 seconds. The strands were cut into EVOH pellets having uniform length with a cutter. The solvent contained in the condenser tank was a mixture of methanol/water of 10/90 and the cooling temperature in the tank was about 0–5° C.

The resulting EVOH pellets were washed twice with pure water each in an amount of 1 to 1.5 times of the weight of the wet EVOH pellets. The time for one wash was 30 to 180 minutes in average. The water on the surface of the washed EVOH pellets was removed by using centrifuge to achieve a solid content of 35 to 50 wt %. The EVOH pellets were immersed in an acid solution containing 0.2 wt % of acetic acid, 0.13 wt % of magnesium dihydrogen phosphate, and 0.05 wt % of potassium dihydrogen phosphate, based on the weight the solid content of EVOH, for 1 to 3 hours. The acid-treated EVOH pellets were dehydrated by using centrifuge, transferred into an oven at a temperature of 75° C. for 6 hours, and then dried in another oven at a temperature of 110° C. for 24 hours to obtain EVOH pellets.

EXAMPLES 2–8

These examples were conducted by following the procedure in Example 1 except subjecting to acid-treatment by using the acid solutions having a composition listed in Table 1.

COMPARATIVE EXAMPLES 1–12

These comparative examples were conducted by following the procedure in Example 1 except subjecting to acid-treatment by using the acid solutions having a composition listed in Table 1.

Heat-resistance Test

The EVOH pellets prepared from Examples 1–8 and Comparative Examples 1–12 were determined their heat-resistance according to the following method.

EVOH pellets were weighted and placed into an aluminum disk having 6 cm length×6 cm width×0.5 cm height. The aluminum disk was placed in an oven at a temperature of 200° C. for 30 minutes. Thereafter, the disk was taken from the oven and stood to cool down at ambient atmosphere. The EVOH pellets were determined its yellowing level according to the method of ASTM D1925 by using color measuring instrument (Model SP 68 Spectrophotomer manufactured by X-Rite Inc.). The yellowing level is expressed as YI (Yellowing Index). The more the YI value the more the yellowing level, i.e. the poorer the heat-resistance. The less the YI value, the less the yellowing level. Therefore, the less YI value indicates that the product can withdraw a higher processing temperature without damaging its quality. The YI values for EVOH pellets obtained in Examples and Comparative Examples are also listed in Table 1.

TABLE 1

| Amount of additives in acid solution[1] | Acetic acid (wt %) | magnesium dihydrogen phosphate (wt %)[2] | Potassium dihydrogen phosphate (wt %) | YI value |
|---|---|---|---|---|
| Example 1 | 0.2 | 0.07 | 0.05 | 24.58 |
| Example 2 | 0.1 | 0.07 | 0.05 | 33.5 |
| Example 3 | 0.3 | 0.07 | 0.1 | 28.62 |
| Example 4 | 0.1 | 0.03 | 0.05 | 55.63 |
| Example 5 | 0.1 | 0.07 | 0.1 | 32.39 |

TABLE 1-continued

| Amount of additives in acid solution[1] | Acetic acid (wt %) | magnesium dihydrogen phosphate (wt %)[2] | Potassium dihydrogen phosphate (wt %) | YI value |
|---|---|---|---|---|
| Example 6 | 0.1 | 0.22 | 0.3 | 44.52 |
| Example 7 | 0.1 | 0.3 | 0.5 | 57.26 |
| Example 8 | 0.3 | 0.03 | 0.05 | 50.1 |
| Comparative Example 1 | 0 | 0 | 0 | 88.63 |
| Comparative Example 2 | 0.1 | 0 | 0 | 76.2 |
| Comparative Example 3 | 0.3 | 0 | 0 | 44.43 |
| Comparative Example 4 | 0.5 | 0 | 0 | 50.38 |
| Comparative Example 5 | 0 | 0.07 | 0 | 60 |
| Comparative Example 6 | 0 | 0 | 0.1 | 77.56 |
| Comparative Example 7 | 0 | 0.22 | 0 | 66.1 |
| Comparative Example 8 | 0 | 0 | 0.3 | 76.07 |
| Comparative Example 9 | 0.1 | 0.15 | 0 | 72.12 |
| Comparative Example 10 | 0.1 | 0 | 0.2 | 48.22 |
| Comparative Example 11 | 0 | 0.07 | 0.1 | 80.03 |
| Comparative Example 12 | 0 | 0.15 | 0.2 | 75.92 |

Note:
[1]Wt % of additive is based on the solid content of EVOH before acid treatment.
[2]Magnesium dihydrogen phosphate tetrahydrate was used as the magnesium dihydrogen phosphate, which formula is $Mg(H_2PO_4)_2 \cdot 4H_2O$, but the wt % in the Table is based on the weight of anhydrous form, i.e. subtracting four crystal water.

From Table 1, it is clearly known that, according to the process of the present invention, use of an acid-treating solution containing acetic acid, magnesium dihydrogen phosphate, and potassium dihydrogen phosphate in acid-treating step will increase the heat resistance of EVOH copolymer.

What is claimed is:

1. A method for increasing heat-resistance of an ethylene-vinyl alcohol copolymer (EVOH), which is characterized by using a mixture of acetic acid, potassium dihydrogen phosphate, and magnesium dihydrogen phosphate as an acid-treating solution to treat the EVOH before its dehydration; wherein the amount of acetic acid is from 0.1 to 1.0 wt %, the amount of magnesium dihydrogen phosphate is from 0.02 to 0.5 wt %, and the amount of potassium dihydrogen phosphate is from 0.05 to 0.5 wt %, based on weight of the solid content of the EVOH.

2. The method according to claim 1, wherein the EVOH is prepared by copolymerizing of ethylene and vinyl acetate, hydrolyzing the resulting ethylene-vinyl acetate copolymer with a base to form ethylene-vinyl alcohol copolymer.

3. The method according to claim 1, wherein the amount of acetic acid is from 0.1 to 0.5 wt %.

4. The method according to claim 1, wherein the amount of magnesium dihydrogen phosphate is from 0.03 to 0.45 wt %.

5. The method according to claim 1, wherein the amount of potassium dihydrogen phosphate is from 0.05 to 0.25 wt %.

6. The method according to claim 1, wherein the amount of acetic acid is from 0.1 to 0.5 wt % and the amount of magnesium dihydrogen phosphate is from 0.03 to 0.45 wt %.

7. The method according to claim 1, wherein the amount of acetic acid is from 0.1 to 0.5 wt % and the amount of potassium dihydrogen phosphate is from 0.05 to 0.25 wt %.

8. The method according to claim 1, wherein the amount of magnesium dihydrogen phosphate is from 0.03 to 0.45 wt % and the amount of potassium dihydrogen phosphate is from 0.05 to 0.25 wt %.

9. The method according to claim 1, wherein the amount of acetic acid is from 0.1 to 0.5 wt %, the amount of magnesium dihydrogen phosphate is from 0.03 to 0.45 wt % and the amount of potassium dihydrogen phosphate is from 0.05 to 0.25 wt %.

* * * * *